US011348071B1

(12) United States Patent
Panikkar et al.

(10) Patent No.: US 11,348,071 B1
(45) Date of Patent: May 31, 2022

(54) ROLE-BASED ACCESS CONTROL ENABLED CORPORATE EMAIL

(71) Applicant: Dell Products L.P., Round Rock, TX (US)

(72) Inventors: Shibi Panikkar, Bangalore (IN); Manav Ghosh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/382,798

(22) Filed: Jul. 22, 2021

(51) Int. Cl.
*G06Q 10/10* (2012.01)
*H04L 51/00* (2022.01)
*H04L 51/42* (2022.01)
*H04L 51/046* (2022.01)

(52) U.S. Cl.
CPC ......... *G06Q 10/107* (2013.01); *H04L 51/046* (2013.01); *H04L 51/12* (2013.01); *H04L 51/22* (2013.01)

(58) Field of Classification Search
None
See application file for complete search history.

(56) References Cited

U.S. PATENT DOCUMENTS

| | | | | |
|---|---|---|---|---|
| 6,442,589 B1 * | 8/2002 | Takahashi | ............. | H04L 51/066 709/203 |
| 6,920,564 B2 * | 7/2005 | Decuir | ............. | H04L 63/0428 713/165 |
| 7,181,496 B1 * | 2/2007 | Edwards | ............. | G06Q 10/107 709/224 |
| 7,987,511 B2 * | 7/2011 | Brown | ............. | H04L 63/04 726/28 |
| 8,156,566 B2 * | 4/2012 | Lim | ............. | H04L 63/101 726/1 |
| 8,250,160 B2 * | 8/2012 | Hirota | ............. | G06Q 10/107 709/225 |
| 8,341,726 B2 * | 12/2012 | Denner | ............. | G06Q 10/00 713/170 |
| 8,478,824 B2 * | 7/2013 | Peled | ............. | H04L 63/105 709/204 |
| 9,747,583 B2 * | 8/2017 | Monaco | ............. | G06F 16/9574 |
| 11,108,714 B1 * | 8/2021 | Shetty | ............. | G06V 30/413 |
| 2002/0132607 A1 * | 9/2002 | Castell | ............. | H04L 63/145 455/412.2 |
| 2003/0233410 A1 * | 12/2003 | Gusler | ............. | G06Q 10/107 709/206 |
| 2004/0049696 A1 * | 3/2004 | Baker | ............. | H04L 51/12 709/204 |
| 2005/0216397 A1 * | 9/2005 | Micci-Barreca | ....... | G06Q 20/10 705/39 |
| 2006/0053279 A1 * | 3/2006 | Coueignoux | ............. | H04L 51/12 713/154 |

(Continued)

*Primary Examiner* — Backhean Tiv
(74) *Attorney, Agent, or Firm* — Daly, Crowley, Mofford & Durkee, LLP

(57) ABSTRACT

A method comprising: receiving, by a first email client, an input specifying one or more permissions that are associated with an email message, any of the permissions being associated with a corresponding action, any of the permissions indicating whether a recipient of the email message is permitted to perform the permission's corresponding action on the email message; and transmitting, by the first email client, the email message and the one or more permissions to an email server.

13 Claims, 10 Drawing Sheets

(56) References Cited

U.S. PATENT DOCUMENTS

| | | | |
|---|---|---|---|
| 2006/0089970 A1* | 4/2006 | Pearson | H04L 63/102 709/206 |
| 2007/0005717 A1* | 1/2007 | LeVasseur | H04L 9/3247 709/206 |
| 2007/0195779 A1* | 8/2007 | Judge | H04L 63/0263 370/235 |
| 2008/0010348 A1* | 1/2008 | Dawson | H04L 51/00 709/206 |
| 2008/0127292 A1* | 5/2008 | Cooper | G06F 21/6281 718/1 |
| 2009/0031393 A1* | 1/2009 | Denner | G06Q 10/00 726/1 |
| 2009/0049139 A1* | 2/2009 | Fouotsop | G06Q 10/107 709/206 |
| 2009/0319623 A1* | 12/2009 | Srinivasan | G06Q 10/107 709/206 |
| 2010/0005145 A1* | 1/2010 | Jaramillo | H04L 51/063 709/206 |
| 2011/0022674 A1* | 1/2011 | Callanan | G06Q 10/107 709/206 |
| 2011/0078263 A1* | 3/2011 | Watanabe | G06Q 10/107 709/206 |
| 2012/0296988 A1* | 11/2012 | Rao | G06Q 10/107 709/206 |
| 2012/0297463 A1* | 11/2012 | Orbach | H04L 51/08 726/4 |
| 2013/0041958 A1* | 2/2013 | Post | G06Q 10/103 709/206 |
| 2013/0166657 A1* | 6/2013 | Tadayon | G06Q 10/107 709/206 |
| 2017/0124038 A1* | 5/2017 | Upadhyay | G06F 40/166 |

* cited by examiner

| FORWARD | REPLY | REPLY ALL | RESEND | REPLY WITH A MEETING | VIEW ATTACHMENT | VIEW | COPY | MOVE | READ ONCE |
|---------|-------|-----------|--------|----------------------|-----------------|------|------|------|-----------|
| BIT 0 | BIT 1 | BIT 2 | BIT 3 | BIT 4 | BIT 5 | BIT 6 | BIT 7 | BIT 8 | BIT 9 |

ROLE-BASED ACCESS CONTROL ENABLED CORPORATE EMAIL

BACKGROUND

Email is one of the most widely and commonly used internet services. The email infrastructure employed on the Internet primarily consists of email servers using Simple Mail Transfer Protocol (SMTP) to accept messages from clients, transport those messages to other servers, and deposit them into a user's server-based inbox. In addition to email servers, the infrastructure includes email clients. Clients retrieve email from their server-based inboxes using Post Office Protocol version 3 (POP3) or Internet Message Access Protocol (IMAP). Clients communicate with email servers using SMTP. Many Internet-compatible email systems rely on the X.400 standard for addressing and message handling.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided comprising: receiving, by a first email client, an input specifying one or more permissions that are associated with an email message, any of the permissions being associated with a corresponding action, any of the permissions indicating whether a recipient of the email message is permitted to perform the permission's corresponding action on the email message; and transmitting, by the first email client, the email message and the one or more permissions to an email server.

According to aspects of the disclosure, a system is provided, comprising: a memory; and at least one processor operatively coupled to the memory, the at least one processor being configured to perform the operations of: receiving, by a first email client, an input specifying one or more permissions that are associated with an email message, any of the permissions being associated with a corresponding action, any of the permissions indicating whether a recipient of the email message is permitted to perform the permission's corresponding action on the email message; and transmitting, by the first email client, the email message and the one or more permissions to an email server.

According to aspects of the disclosure, a non-transitory computer-readable medium is provided that stores one or more processor-executable instructions, which, when executed by at least one processor, cause the at least one processor to perform the operations of: receiving, by a first email client, an input specifying one or more permissions that are associated with an email message, any of the permissions being associated with a corresponding action, any of the permissions indicating whether a recipient of the email message is permitted to perform the permission's corresponding action on the email message; and transmitting, by the first email client, the email message and the one or more permissions to an email server.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2 is a diagram of an example of a set of permission flags, according to aspects of the disclosure.

DETAILED DESCRIPTION

Figure 1A:
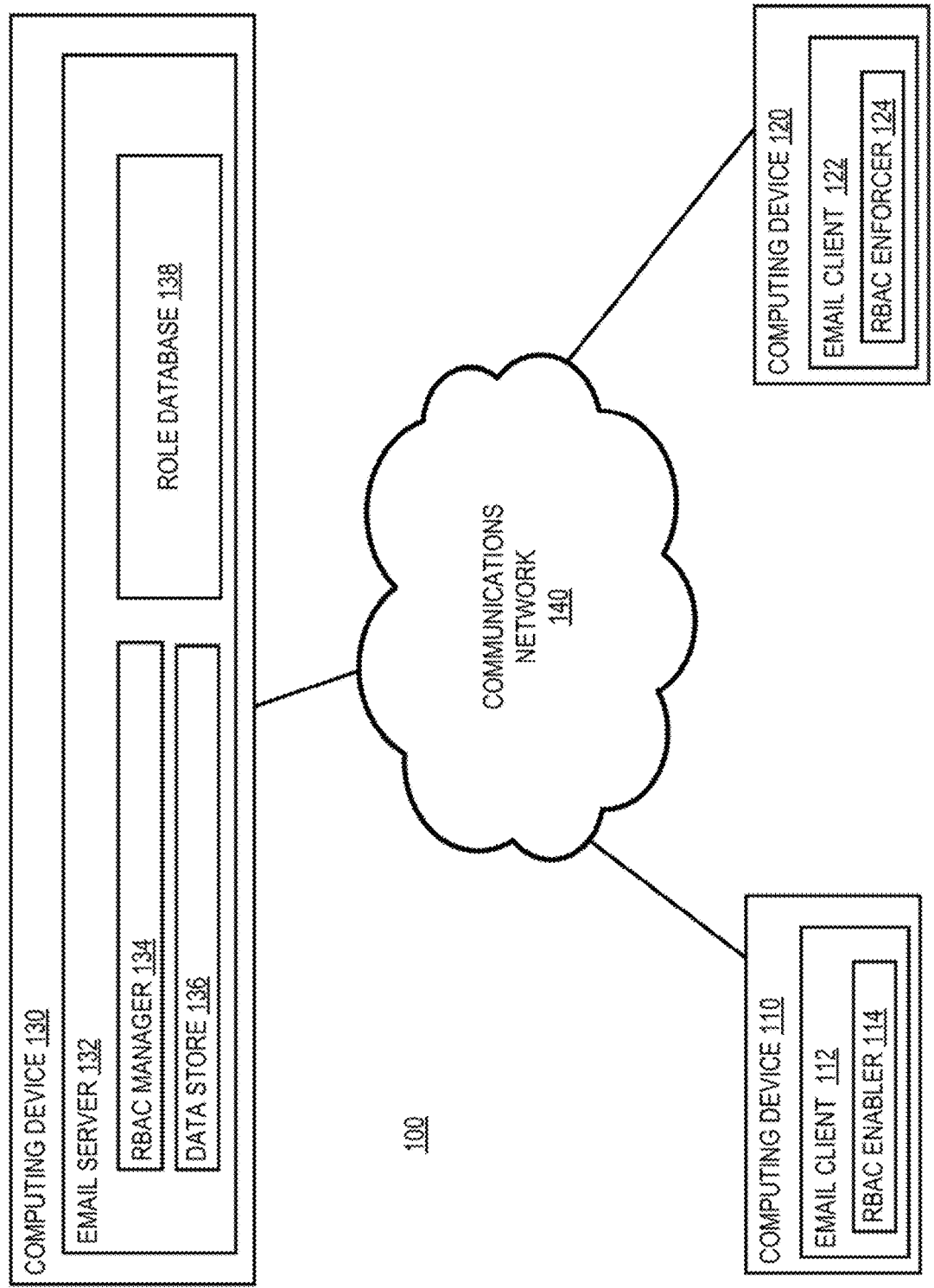
FIG. 1A is a diagram of an example of a system according to aspects of the disclosure.

FIG. 1 is a diagram of an example of a system 100, according to aspects of the disclosure. As illustrated, the system 100 may include computing devices, 110, 120, and 130, which are coupled to one another via a communications network 140. Any of the computing devices 110, 120, and 130 may include one or more of a desktop computer, a laptop, a smartphone, and/or any other suitable type of computing device. According to the present example, each of the computing devices 110 and 120 includes a device that is used by employees of a corporation to access email and the communications network 140 includes an enterprise network of the corporation. However, it will be understood that the present disclosure is not limited to any specific implementation or usage of the computing devices 110 and 120 and the communications network 140. For example, the communications network 140 may include one or more of a local area network (LAN), a wide area network (WAN), the Internet, an InfiniBand network, and/or any other suitable type of communications network 140.

The computing device 110 may be configured to include an email client 112. The email client 112 may include a Role-Based Access Control (RBAC) enabler 114 (hereinafter "enabler 114"). According to the present example, the RBAC enabler 114 is implemented as a module or plugin to the email client 112. However, alternative implementations are possible in which the RBAC enabler 114 is implemented as a separate application and/or in any other suitable manner. The computing device 120 may be configured to include an email client 122. The email client 122 may include a Role-Based Access Control (RBAC) enforcer 124 (hereinafter "enforcer 124"). According to the present example, the enforcer 124 is implemented as a module or plugin to the email client 122. However, alternative implementations are possible in which the RBAC enforcer 124 is implemented as a separate application and/or in any other suitable manner.

Although the computing device 110 is depicted as executing an RBAC enabler only, it will be understood that in many practical applications the computing device 110 may execute both an RBAC enabler and an RBAC enforcer. Although the computing device 120 is depicted as executing an RBAC enforcer only, it will be understood that in many practical applications the computing device 110 may execute both an RBAC enabler and an RBAC enforcer.

The computing device 130 may execute an email server 132. The email server 132 may include an RBAC manager 134, a role database 138, and a data store 136. As is discussed further below, the role database 138 may include a database that identifies the roles of different employees in the corporation. For example, the database may cross-reference the name or email address of each (or at least some) of the employees in the corporation with his or her role. Example of roles include "president", "vice-president", "director", "software developer", etc. The data store 138 may include one or more storage locations where the RBAC manager 134 stores permission definitions, as well as other information related to the operation of the RBAC manager.

The RBAC enabler 114 may include software for specifying permissions that are associated with an outgoing email message that is written (and/or transmitted) by the email client 112. Each of the permissions may be associated with one or more respective actions, which a recipient of the email message can perform on the email message. According to one example, the RBAC manager may support permissions for the following actions: Forward, Reply, Reply All, Resend, Reply With Meeting, Open Attachment, View, Copy, Move, Read Once, Read. In other words, the RBAC enabler 114 allows the sender of the email message to specify which of the above actions a recipient of an email message is going to be permitted to perform. For example, by using the RBAC enabler 114, the sender may specify that the recipient is not permitted to forward the email message or open any attachments that are appended to the email message. As another example, by using the RBAC enabler 114, the sender of an email message may specify that the recipient is permitted to read the email message only once or read the email message multiple times. As yet another example, by using the RBAC enabler 114, the sender of the email message may specify that the recipient of the email message is not allowed to copy or move the email message to a local folder. As yet another example, by using the RBAC enabler 114, the sender of the email message may specify whether the recipient is allowed to reply to the email message with a meeting. It will be understood that the above actions are listed as an example only, and the present disclosure is not limited to specifying permissions for any specific email message-related action.

In a corporate context, a project may be associated with a mailing list (e.g., xaas.dev). The mailing list may include the email addresses of all people who are involved in the project—from very high-ranking people within the company to relatively low-ranking people. When a user sends an email message to the mailing list, the user may want to impose restrictions on the use of the email message by at least some of the people on the list. For instance, the user may want to prevent people below the rank of developer from opening attachments, saving (in a local folder) or copying the email messages. The RBAC enabler 114 permits the sender of the email to impose such restrictions (or permissions), even in situations in which the sender does not know all of the people who might be on the mailing list.

In some implementations, the RBAC enabler 114 may support the use of expressions to specify permissions for an outgoing email message. For example, the user may use the following expression to specify that all recipients of rank vice-president (VP) and higher are permitted to open attachments: "$ALL_USER>$VP→open_attachments, view". As another example, the user may use the following expression to specify that recipients of rank lower than VP are allowed to view the email message, but not allowed to open attachments "$ALL_ USER>$VP→view". In the present example, recipients are denied permissions by default, and in order for a recipient to be able to perform an action, the recipient must be explicitly granted the permission. However, alternative implementations are possible in which recipients are granted permissions by default, and in order for a recipient to be denied permission to perform an action, the recipient must be explicitly denied the permission.

In one respect, the expressions supported by RBAC enabler 114 allow email message recipients to be referenced by their rank or role within a company. As used herein, the terms "rank" and "role" are used interchangeably. Specifically, the RBAC enabler 114 may support (system) variables, which allow the recipients to be referenced by their rank or role within the company. Examples of such variables include "$ALL_USERS", "$VP", "DIRECTOR", $"OTHERS". According to the present example, variable $ALL_USERS references all recipients of an email message, variable $VP reference only recipients of an email message whose rank is VP, variable $DIRECTOR references only recipients of an email message whose rank is director, and variable $OTHER references all recipients of an email message who are not already associated with a permission.

In another respect, the expressions supported by the RBAC enabler 114 take into account the hierarchical structure of a company. Specifically, the expressions support operators, which allow permissions to be specified in terms of the position of a role within the hierarchical structure of a company. Such operators include "−", "<", ">", "+", etc. For example, the expression "$ALL_USERS−$VP" may reference all recipients of an email message, except for recipients whose rank is VP. As another example, the expression "$VP+$DIRECTOR" may reference all recipients of an email message whose rank is VP or director. As yet another example, the expression "$ALL_USER>$VP" may reference all recipients above the VP level.

The email server 132 may be configured to receive an email message that is transmitted to a mailing list (e.g., xaas.dev, etc.), as well as well as one or more expressions specifying permissions for the email message. The RBAC manager 134 may then identify each (or one or more) of the recipients in the mailing list. For one or more of the recipients, the RBAC manager 134 may resolve the expressions into a set of flags.

FIG. 2 shows an example of a set of permission flags 200 that is resolved for a particular recipient of an email message (hereinafter "associated recipient") based on one more expressions that are received at the RBAC manager 134 from the RBAC enabler 114. It will be understood that the set of flags 200 is an example of one of many possible ways for encoding the permissions that are afforded to one specific email recipient by at least one permission definition. As used throughout the disclosure, the phrase "set of permission flags" shall refer to any number, string, or alphanumerical string that identifies whether an email recipient is permitted to perform one or more actions on the email. Although in the examples that follow permissions are encoded by setting corresponding bits, it will be understood that the present disclosure is not limited to any specific way of encoding permissions.

According to the example, each flag in the set of permission flags 200 includes a single bit. More specifically, bit 0 is associated with a "forward" action—when bit 0 is set to '1', the recipient is permitted to forward the email message, and when bit 0 is set to '0' the recipient is not permitted to forward the email message. Bit 1 is associated with a "reply" action—when bit 1 is set to '1', the recipient is permitted to reply to the email message, and when bit 1 is set to '0' the recipient is not permitted to reply to the email message. Bit 2 is associated with a "reply all" action—when bit 2 is set to '1', the recipient is permitted to execute the "reply all" action on the email message, and when bit 2 is set to '0' the recipient is not permitted to execute the "reply all" action. Bit 3 is associated with a "resend" action—when bit 3 is set to '1', the recipient is permitted to resend the email message, and when bit 3 is set to '0' the recipient is not permitted to resend the email message. Bit 4 is associated with a "reply with a meeting" action—when bit 4 is set to '1', the recipient is permitted to reply to the email message with a meeting invite, and when bit 4 is set to '0' the recipient is not permitted to reply to the email message with a meeting invite. Bit 5 is associated with a "view attachment" action—when bit 5 is set to '1', the recipient is permitted to view attachments that are appended to the email message, and when bit 5 is set to '0' the recipient is not permitted to view attachments that are appended to the email message. Bit 6 is associated with a "view" action—when bit 6 is set to '1', the recipient is permitted to view the email message, and when bit 6 is set to '0' the recipient is not permitted to view the email message. Bit 7 is associated with a "copy" action—when bit 7 is set to '1', the recipient is permitted to copy the email message, and when bit 7 is set to '0' the recipient is not permitted to copy the email message. Bit 8 is associated with a "move" action—when bit 8 is set to '1', the recipient is permitted to move the email message into a local folder, and when bit 8 is set to '0' the recipient is not permitted to move the email message into a local folder. Bit 9 is associated with a "read once" action—when bit 9 is set to '1', the recipient is permitted to read the email message only once, and when bit 9 is set to '0' the recipient is not permitted to read the email message.

Figure 1B:
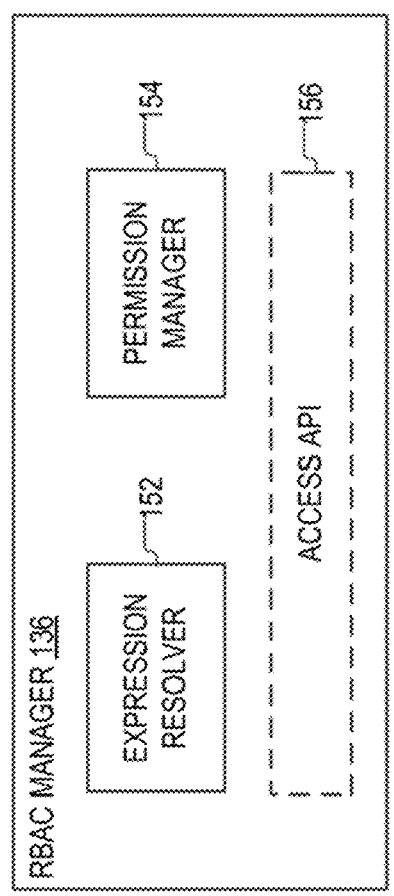
FIG. 1B is a diagram of an example of a role-based access control (RBAC) manager, according to aspects of the disclosure.

FIG. 1B is a diagram of the RBAC manager, according to aspects of the disclosure. As illustrated in FIG. 1B, in some implementations, the RBAC manager 134 may include an expression resolver 152, a permission manager 154, and an access application programming interface (API) 156. The expression resolver 152 may include one or more processor executable instructions for resolving one or more permission expressions into permission flags. The permission manager 154 may be include one or more processor-executable instructions that are arranged to manage permissions that are associated with an email message. For example, the permission manager 154 may be configured to store any permission definitions that are received by the RBAC manager 134 into the data store 136. In addition, the permission manager 154 may be configured to interact with the role database 138 to identify the respective roles of email message recipients. The access API 156 may include an API for receiving a request to resolve the permissions of a particular email message and returning a set of permission flags in response to the request.

Returning to FIG. 1A, the RBAC enforcer 124 may include software for enforcing permissions that are associated with an email message that is received by the email client 112. For example, in some implementations, for each action that is identified as permitted by the one or more permission flags, the computing device 130 may: (i) enable a component of the email client 122 that is configured to perform the action or (ii) enable a user interface component that is configured to trigger the action. As another example, in some implementations, for each action that is identified as not being permitted by the one or more permission flags, the computing device 130 may: (i) disable a component of the email client 122 that is configured to perform the action or (ii) disable a user interface component that is configured to trigger the action.

Figure 3:
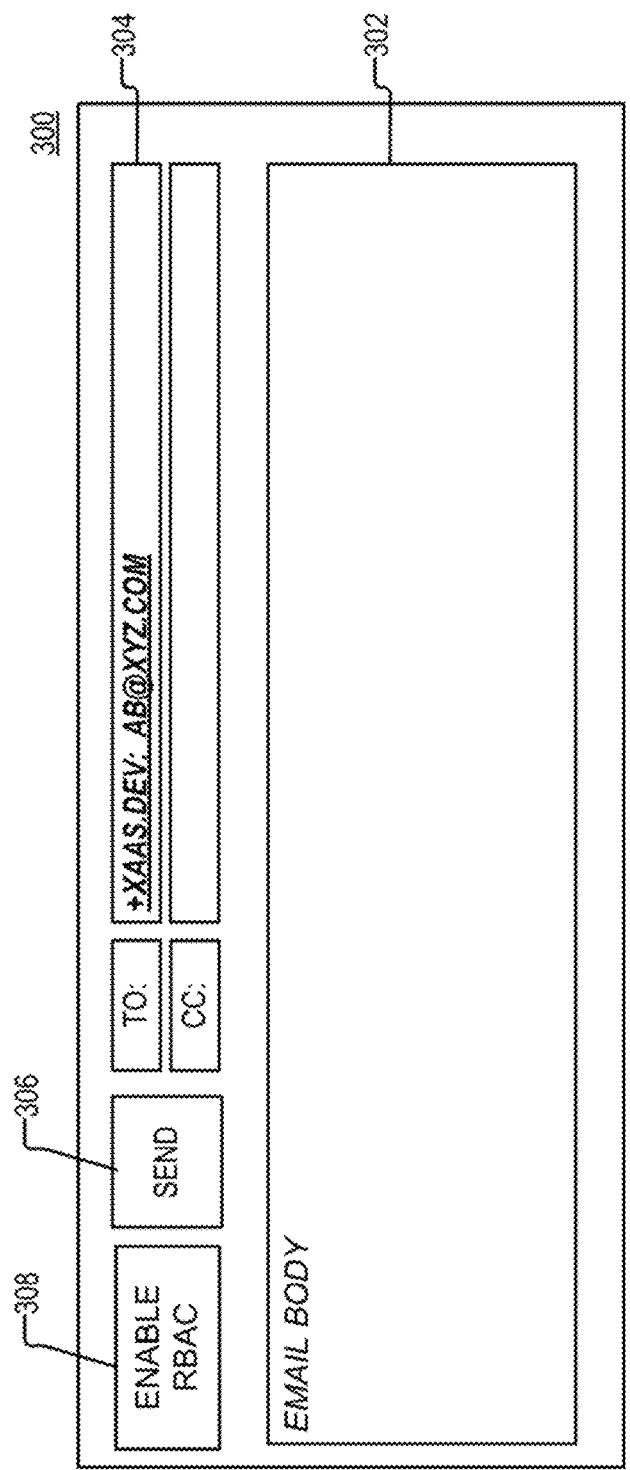
FIG. 3 is a diagram of an example of a user interface for writing emails, according to aspects of the disclosure.

FIG. 3 is a diagram of an example of a user interface 300, for writing email messages. The user interface 300 may be displayed on a display screen of the computing device 110. The user interface 300 may be part of the email client 112. The user interface 300 may include a field 302 (e.g., a text input field) for typing the body of an email. The user interface 300 may further include a field 304 (e.g., a text input field) for entering the email addresses of one or more recipients of the email. As illustrated, the user may enter, into the field 304, a mailing list address (e.g., +xaas.dev) and/or an individual email address. Furthermore, the user interface 300 may include a send button 306. When the send button 306 is pressed, the email client 112 may generate an email message containing the contents of the field 302 and forward the generated email message to the email server 132 for distribution to the recipients specified in the field 304. Furthermore, the user interface 300 may include a button 308. When the button 308 is pressed, an interface 400 for specifying one or more permissions for the email (that is input into field 302) may be displayed.

Figure 4:
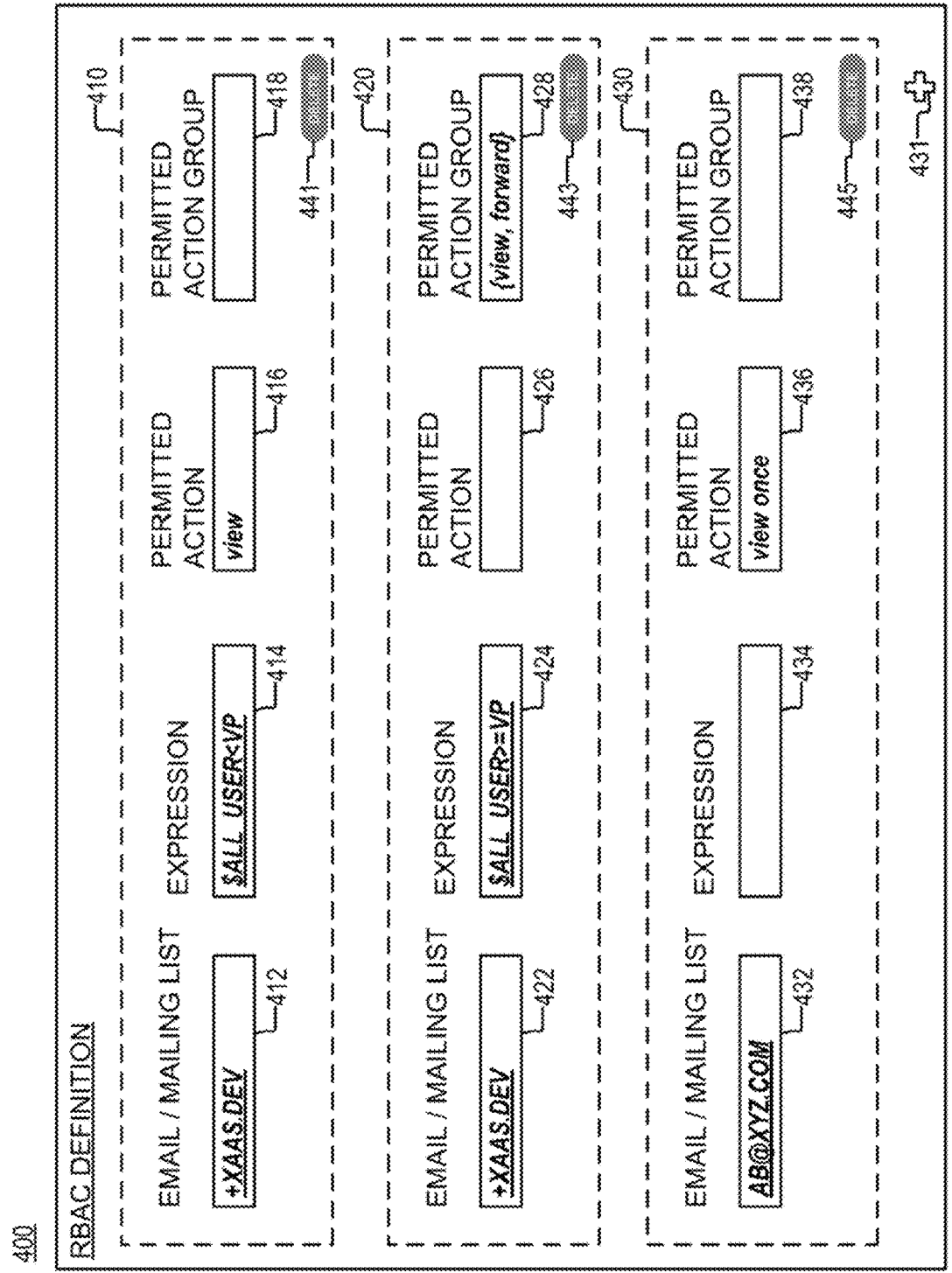
FIG. 4 is a diagram of an example of a user interface for specifying permissions, according to aspects of the disclosure.

FIG. 4 is a diagram illustrating an example of an interface 400 for specifying permissions that are associated with an email. In the example of FIG. 4, the interface 400 includes permission definitions 410, 420, and 430 and a button 431 for adding more definitions to the set of definitions that is already present in the interface 400.

Permission definition 410 may include input fields 412-418 and a delete button 441, which can be used to delete the permission definition 410. Input field 412 may be a text-input field for specifying one or more recipients that are associated with the permission definition 410. The recipient(s) may be specified via a mailing list address or an individual email address. Input field 414 may be a text input field for optionally specifying an expression that is associated with the permission definition 410. As noted above, the expression may be used to carve out a (proper) subset of all recipients that are specified in the input field 412. Input field 416 may be a text input field. Input field 416 may be used to specify a single action which the set of recipients (defined by input fields 412 and 414) is permitted to perform on the email message. Input field 418 may be a text input field. Input field 418 may be used to specify a user-defined group of actions. The group of actions may be referenced by its name in the input field 418. The definition of the group of actions may be stored in the memory of the computing device 110 or in the memory of the computing device 130. According to the present example, permission definition 410 defines the following permission: "out of all recipients on the mailing lists xaas.dev, those of rank lower than VP are allowed to only view the email message."

Permission definition 420 may include input fields 422-428 and a delete button 443, which can be used to delete the permission definition 420. Input field 422 may be a text-input field for specifying one or more recipients that are associated with the permission definition 420. The recipient(s) may be specified via a mailing list address or an individual email address. Input field 424 may be a text input field for optionally specifying an expression that is associated with the permission definition 420. As noted above, the expression may be used to carve out a (proper) subset of all recipients that are specified in the input field 422. Input field 426 may be a text input field. Input field 426 may be used to specify a single action which the set of recipients (defined by input fields 422 and 424) is permitted to perform on the email message. Input field 428 may be a text input field. Input field 428 may be used to specify a user-defined group of actions. The group of actions may be referenced by its name in the input field 428. The definition of the group of actions may be stored in the memory of the computing device 110 or in the memory of the computing device 130. According to the present example, permission definition 420 defines the following permission: "out of all recipients on the mailing lists xaas.dev, those of rank VP and higher are allowed to view and forward the email message."

Permission definition 430 may include input fields 432-438 and a delete button 445, which can be used to delete the permission definition 430. Input field 432 may be a text-input field for specifying one or more recipients that are associated with the permission definition 430. The recipient(s) may be specified via a mailing list address or an individual email address. Input field 434 may be a text input field for optionally specifying an expression that is associated with the permission definition 430. As noted above, the expression may be used to carve out a (proper) subset of all recipients that are specified in the input field 432. Input field 436 may be a text input field. Input field 436 may be used to specify a single action which the set of recipients (defined by input fields 432 and 434) is permitted to perform on the email message. Input field 438 may be a text input field. Input field 438 may be used to specify a user-defined group of actions. The group of actions may be reference by a name in the input field 438. The definition of the group of actions may be stored in the memory of the computing device 110 or in the memory of the computing device 130. According to the present example, permission definition 430 defines the following permission: "the recipient having email address ab@xyz.com is allowed to view the email message only once."

FIGS. 1-4 illustrate an example in which one or more permission definitions are associated with an email message and transmitted to an email server for further processing, concurrently with the email. In the example of FIGS. 1-4, the one or more permission definitions apply only to the email message they are accompanied by. However, it will be understood that in some implementations, a sender may specify one or more permissions ahead of time, and have the permission definitions apply to multiple email messages that are transmitted by the sender afterwards. In such implementations, the permission definitions may be transmitted to the email server 132 before (e.g., days or weeks) before the email message. Moreover, in some implementations, the permission definitions may be transmitted separately of one or more emails they apply. Alternatively, in some implementations, the permission definitions may be embedded in an email message to which they apply.

FIGS. 3-4 provide an example of one possible user interface for specifying permission definitions for outgoing email messages. However, it will be understood that the present disclosure is not limited to any specific user interface for specifying permission definitions. The term "input component" as used throughout the disclosure may refer to any suitable type of input component, such as a button, a drop-down menu, a checklist, an input field, etc. For instance, the button 308 (shown in FIG. 3) may be substituted with a drop-down menu, a link, a checkbox, and/or any other suitable type of input component. The term "input field" as used throughout the disclosure refers to a text input field. It will be understood that any of the input components discussed with respect to FIGS. 3-4 may be substituted with another input component, such as a drop-down menu, a checkbox menu, etc.

Figure 5:
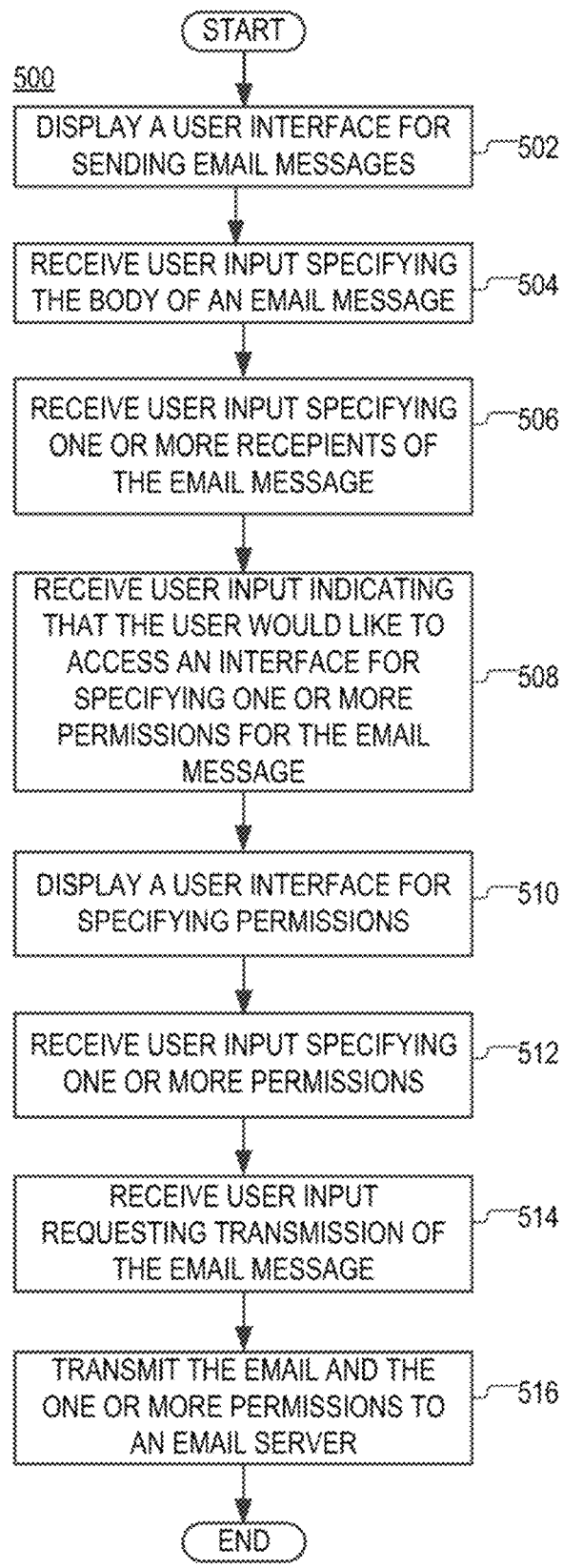
FIG. 5 is a flowchart of an example of a process, according to aspects of the disclosure.

FIG. 5 is a flowchart of an example of a process 500, according to aspects of the disclosure. At step 502, the computing device 110 displays the user interface 300 on a display screen of the computing device 110. At step 504, the computing device 110 receives user input specifying the body of an email message. The user input may be received via the field 302 of the user interface 300. At step 506, the computing device 110 receives user input specifying one or more recipients for the email message. The user input may be received via field 304 of the user interface 300. At step 508, the computing device 110 detects that the user has pressed the button 308 of the user interface 300. At step 510, in response to detecting that the button 308 is pressed, the computing device 110 displays the interface 400. At step 512, the computing device 110 receives user input specifying one or more permissions for the email message (that is entered into field 302). The user input may be provided via the interface 400. The user input may include permission definitions 410, 420, and 430, which are shown in FIG. 4. At step 514, the computing device 110 detects that the send button 306 is pressed. At step 516, in response to detecting the at the send button 306 is pressed, the computing device transmits the email message and the permissions (specified at step 512) to the computing device 130.

Figure 6:
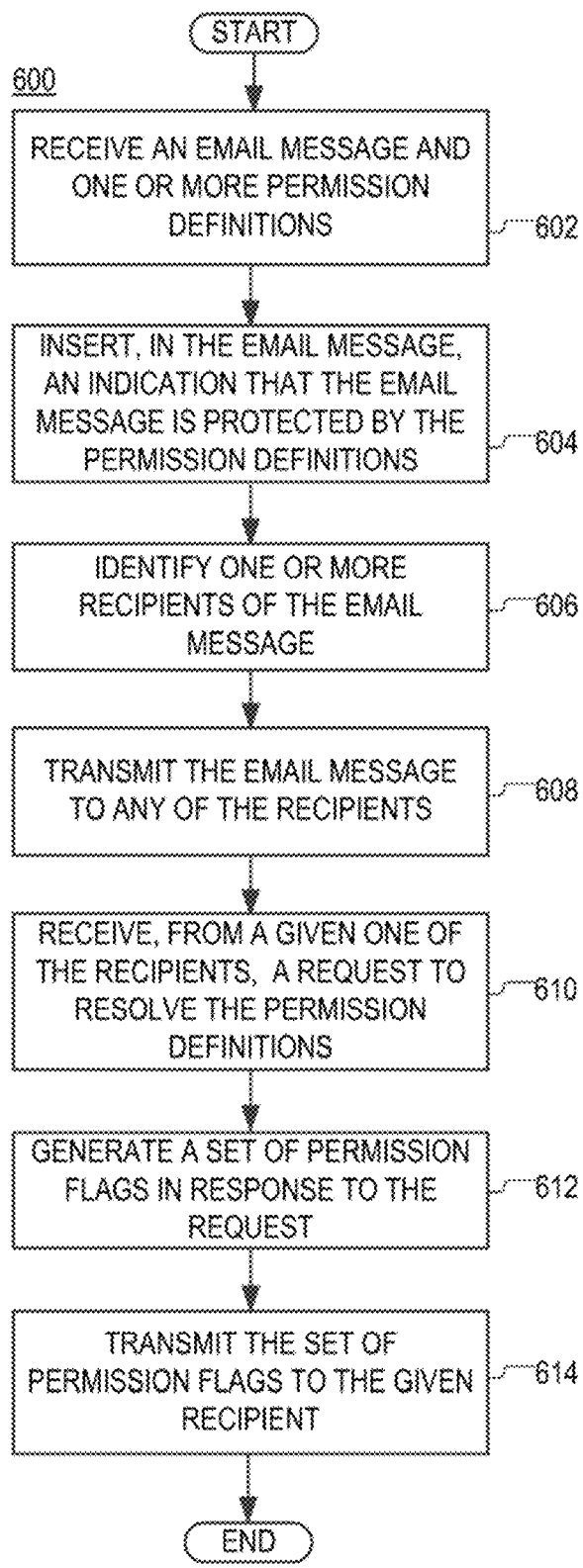
FIG. 6 is a flowchart of an example of a process, according to aspects of the disclosure.

FIG. 6 is a flowchart of an example of a process 600, according to aspects of the disclosure. At step 602, the email server 132 receives the email message and the one or more permission definitions, which are transmitted at step 516 of the process 500. At step 604, the RBAC manager 134 inserts in the header and/or payload of the email message an indication that the email message is protected by the one or more permission definitions. At step 606, the email server 132 identifies one or more recipients of the email message. The one or more recipients may be identified by: (i) retrieving one or more recipient email addresses from a header of the email message, and/or (ii) retrieving a mailing list address from the header and identifying one or more email addresses that are on the mailing list. At step 608, the email message is transmitted to each (or at least one) of the identified recipients by the email server 132. At step 610, the RBAC manager 134 receives, from a given one of the recipients, a request to resolve the permission definitions. The request may be received via the access API 156. At step 612, the computing device 130 (and/or the RBAC manager 134) generates a set of permission flags based on the permission definitions. The set of permission flags may be the same or similar to the set of permission flags 200, which is shown in FIG. 2. The set of permission flags may be generated by: (i) identifying one or more permission definitions that reference the email address of the given recipient, (ii) setting to '1' bits in the set of flags that correspond to actions, which the given recipient is allowed to perform (explicitly or implicitly) by the identified permissions, and/or (iii) setting to '0' bits in the set of flags that correspond to actions, which the given recipient is prevented from performing (explicitly or implicitly) by the identified permissions. Additionally or alternatively, the set of permission flags may be generated by: (i) identifying a role of the given recipient by using the role database 138, (ii) identifying one or more permission definitions that reference the role of the given recipient, (iii) setting to '1' bits in the set of flags that correspond to actions, which users having the same role as the given recipient are allowed to perform (explicitly or implicitly) by the identified permissions, and/or (iv) setting to '0' bits in the set of flags that correspond to actions, which users having the same role as the given recipient are prevented from performing (explicitly or implicitly) by the identified permissions. At step 614, the RBAC manager 134 transmits the set of permission flags to the given recipient.

Figure 7:
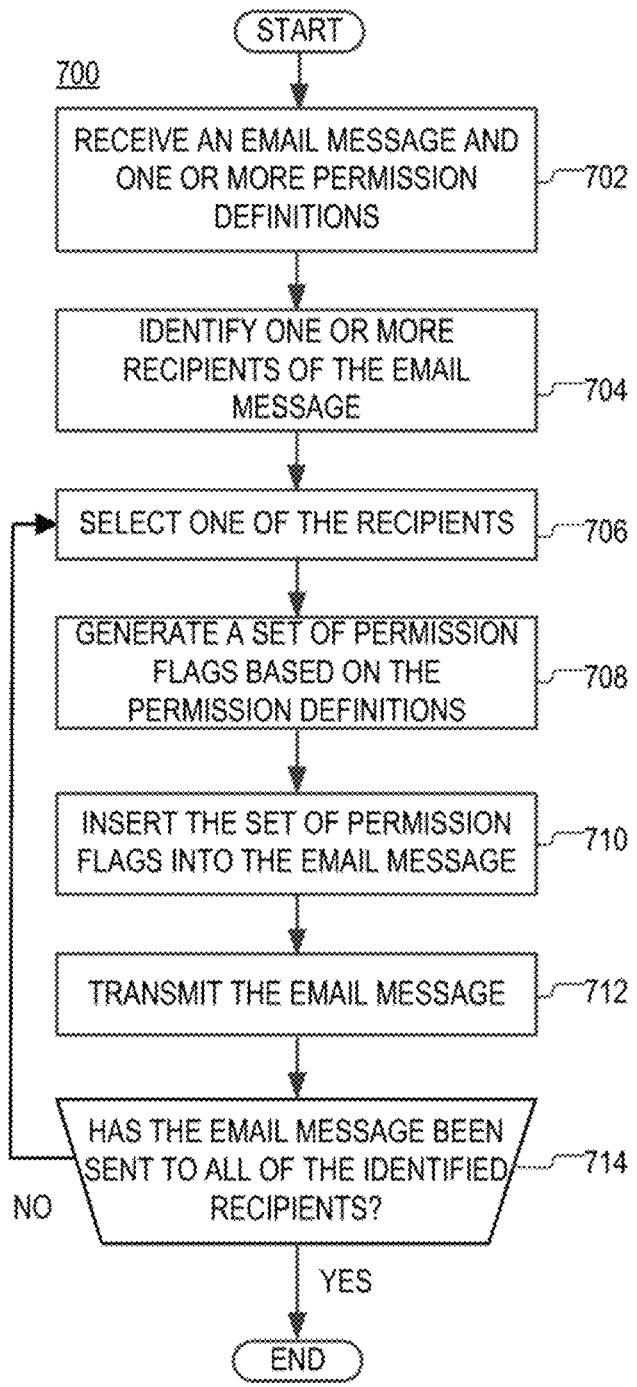
FIG. 7 is a flowchart of an example of a process, according to aspects of the disclosure.

FIG. 7 is a flowchart of an example of a process 700, according to aspects of the disclosure. At step 702, the email server 132 receives the email message and the one or more permission definitions, which are transmitted at step 516 of the process 500. At step 704, the email server 132 identifies one or more recipients of the email message. Step 704 may be performed in the same manner as step 606, which is discussed above with respect to FIG. 6. At step 706, the email server 132 selects one of the recipients. At step 708, the RBAC manager 134 generates a set of one or more permission flags for the selected recipient. The set of permission flags may be generated based on the one or more permission definitions (received at step 702). The set of permission flags may be generated in the manner discussed above with respect to step 612 of the process 600. At step 710, the RBAC manager 134 inserts the one or more permission flags in the header and/or payload of the email message. At step 712, the email server 132 transmits the email message to the selected recipient. At step 714, the email server 132 detects if the email message has been transmitted to all identified recipients. If the email message has not been transmitted to all identified recipients, the process 700 returns to step 706. Otherwise, the process 700 ends.

Figure 8:
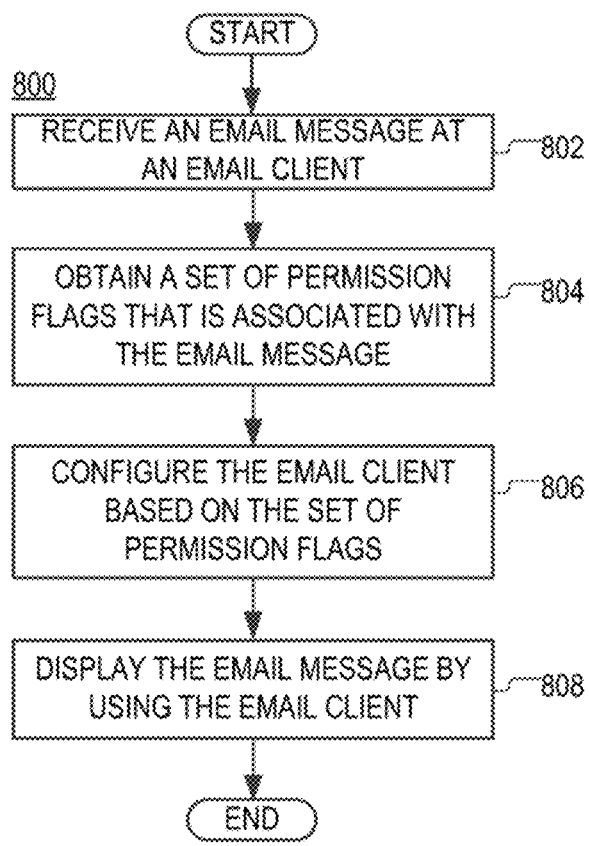
FIG. 8 is a diagram of an example of a process, according to aspects of the disclosure.

FIG. 8 is a flowchart of an example of a process 800, according to aspects of the disclosure. At step 802, the email client 122 receives the email message transmitted at steps 614 or 710. At step 804, the RBAC enforcer 124 obtains a set of permission flags that are: associated with the email message, and a recipient that is associated with the computing device 120 (e.g., the user of the computing device 120). In some implementations, obtaining the set of permission flags may include retrieving the set of permission flags from the email message. Additionally or alternatively, in some implementations, obtaining the set of permission flags may include: (i) detecting that the email message includes an indication that the message is protected by one or more permissions, (ii) transmitting to the computing device 130, a request to provide one or more permission flags that are associated with the message, and (iii) receiving, from the computing device 130, the set of permission flags in response to the request. In some implementations, the request for the one or more permission flags may be the same or similar to the request received at step 610 of the process 600. At step 806, the RBAC enforcer 124 configures the email client 122 based on the set of permission flags. At step 808, the computing device 120 displays the email message by using the email client 122.

In some implementations, configuring the email client 122 based on the set of permission flags may include transitioning the email client 122 into a state in which (i) all (or at least some) actions that are identified as permitted by the permission flags are enabled. For example, in some implementations, for each action that is identified as permitted by the set of permission flags, the computing device 130 may: (i) enable a component of the email client 122 that is configured to perform the action or (ii) enable a user interface component that is configured to trigger the action. For instance, if the permission flags indicate that the user is permitted to forward the email message, the RBAC enforcer 124 may either enable a component of the email client 122 that is configured to forward email messages or enable the "forward" button of the email client.

Additionally or alternatively, in some implementations, configuring the email client 122 based on the set of permissions may include transitioning the email client 122 into a state in which all (or at least some) actions that are identified as not permitted by the permission flags are disabled. For example, in some implementations, for each action that is identified as not being permitted by the set of permission flags, the RBAC enforcer 124 may: (i) disable a component of the email client 122 that is configured to perform the action and/or (ii) disable a user interface component that is configured to trigger the action. For instance, if the permission flags indicate that the recipient is not permitted to forward the email message, the RBAC enforcer 124 may disable the component of the email client 122 that is configured to forward email messages and/or disable the "forward" button of the email client.

Figure 9:
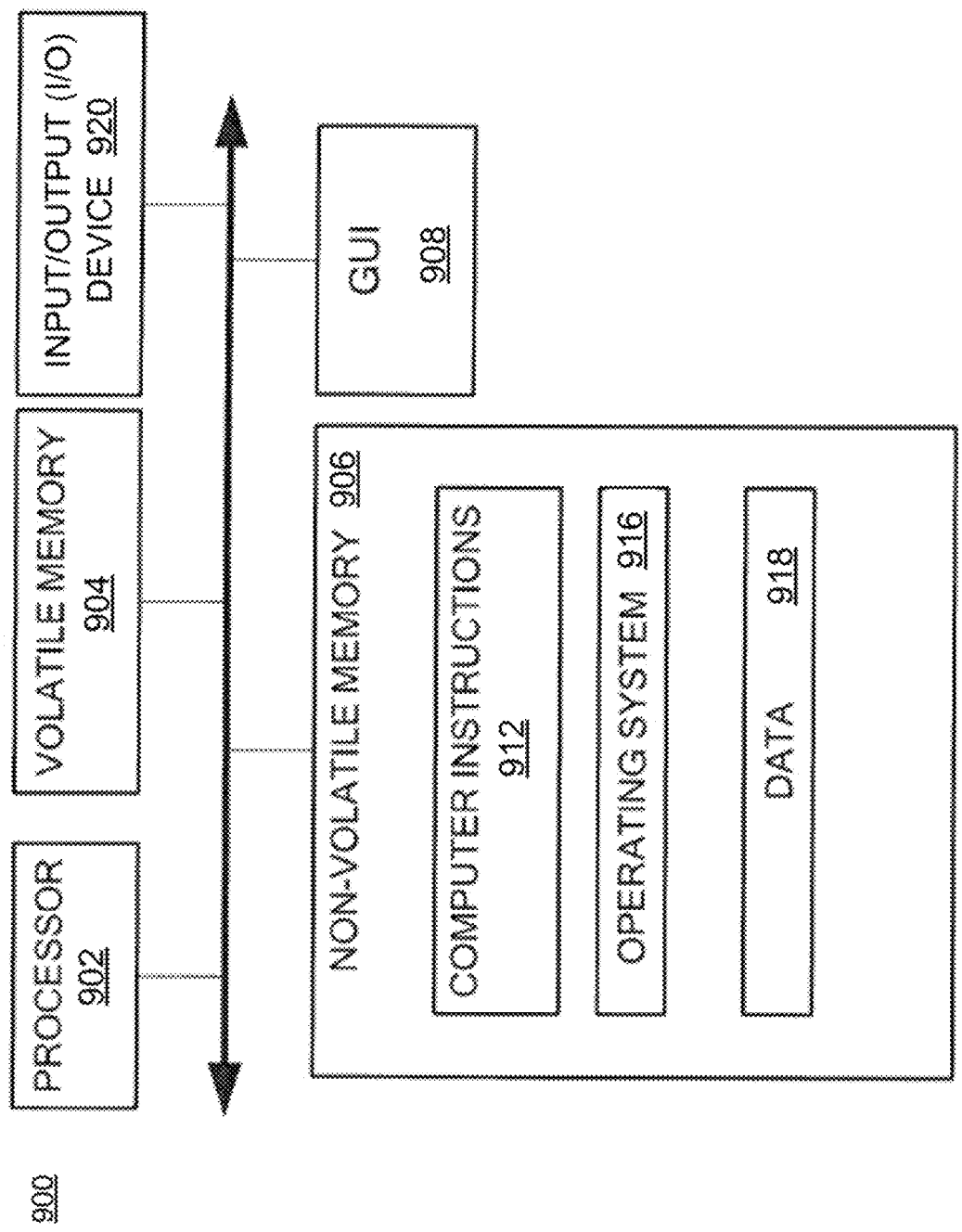
FIG. 9 is a diagram of an example of an electronic, according to aspects of the disclosure.

Referring to FIG. 9, computing device 900 that can be used to implement any of computing devices 110, 120, and 130. As illustrated, the computing device 900 may include processor 902, volatile memory 904 (e.g., RAM), non-volatile memory 906 (e.g., a hard disk drive, a solid-state drive such as a flash drive, a hybrid magnetic and solid-state drive, etc.), graphical user interface (GUI) 908 (e.g., a touchscreen, a display, and so forth) and input/output (I/O) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904. Program code may be applied to data entered using an input device of GUI 908 or received from I/O device 920.

Processor 902 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

As used in this application, the phrase "set of flags" may refer to a single flag or to more than one flags. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
receiving, by a first email client, an input specifying one or more permissions that are associated with an email message, each of the permissions being associated with a corresponding action, any of the permissions indicating whether a recipient of the email message is permitted to perform the permission's corresponding action on the email message; and
transmitting, by the first email client, the email message and the one or more permissions to an email server,
wherein the email message is directed to a plurality of recipient, each of the plurality of recipients having a respective role within a company, and
wherein at least one of the permissions is defined using an expression that specifies which ones of the plurality of recipients are permitted to perform the permission's corresponding action, the expression including (i) a first variable identifying a proper or improper subset of the plurality recipients, (ii) a second variable corresponding to a role within the company, and (iii) an operator that selects only some of the recipients in the subset based on whether the respective role of each of the selected recipients is higher or lower than the role specified by the second variable.

2. The method of claim 1, wherein the email message is transmitted separately of the one or more permissions.

3. The method of claim 1, wherein the expression identifies fewer than all of the plurality of recipients as being permitted to perform the corresponding action of the at least one permission that is defined using the expression.

4. The method of claim 1, wherein at least one of the permissions specifies whether a recipient of the email message is permitted to open an attachment of the email message.

5. The method of claim 1, wherein:
the email message is directed to a mailing list, the mailing list including the plurality of recipients, and
the input includes the expression.

6. The method of claim 1, further comprising:
displaying a user interface for writing the email message, the user interface including an input component;
detecting that the input component has been activated; and
displaying a user interface for specifying permissions that are associated with the email message,
wherein the input specifying the one or more permissions is received via the user interface for specifying permissions.

7. The method of claim 1, further comprising:
resolving, by the email server, the expression to generate one or more flags for at least one of the plurality of recipients; and
transmitting, by the email server, the one or more flags and the email message to a second email client that is associated with the recipient.

8. The method of claim 1, further comprising:
transmitting the email message from the email server to a second email client;
receiving, by the email server, a request to resolve the expression, the request being received from the second email client;
resolving, by the email server, the expression to generate one or more flags that are associated with the second email client; and
transmitting the one or more flags to the second email client.

9. A system, comprising:
a memory; and
at least one processor operatively coupled to the memory, the at least one processor being configured to perform the operations of:
receiving, by a first email client, an input specifying one or more permissions that are associated with an email message, each of the permissions being associated with a corresponding action, any of the permissions indicating whether a recipient of the email message is permitted to perform the permission's corresponding action on the email message; and
transmitting, by the first email client, the email message and the one or more permissions to an email server,
wherein the email message is directed to a plurality of recipients, each of the plurality of recipients having a respective role within a company, and
wherein at least one of the permissions is defined using an expression that specifies which ones of the plurality of recipients are permitted to perform the permission's corresponding action, the expression including (i) a first variable identifying a proper or improper subset of the plurality recipients, (ii) a second variable corresponding to a role within the company, and (iii) an operator that selects only some of the recipients in the subset based on whether the respective role of each of the selected recipients is higher or lower than the role specified by the second variable.

10. The system of claim 9, wherein:
the email message is directed to a mailing list, the mailing list including the plurality of recipients, and
the input includes the expression.

11. The system of claim 9, wherein the email message is transmitted separately of the one or more permissions.

12. The system of claim 9, wherein the expression identifies fewer than all of the plurality of recipients as being permitted to perform the corresponding action of the at least one permission that is defined using the expression.

13. A method, comprising:
receiving an email message at an email client, the email message being received from an email server;
receiving, by the email client, one or more flags that are associated with the email message, the one or more flags being received from the email server, the one or more flags being generated by the email server based on one or more permissions that are associated with the email message, the one or more permissions being received at the email server from a sender of the email message, each of the permissions being associated with a corresponding action, any of the permissions indicating whether a recipient of the email message is permitted to perform the permission's corresponding action on the email message; and
enabling or disabling at least one function of the email client based on the one more flags.

* * * * *